United States Patent [19]
Cahill-O'Brien et al.

[11] Patent Number: 5,457,963
[45] Date of Patent: Oct. 17, 1995

[54] CONTROLLED ATMOSPHERE SYSTEM FOR A REFRIGERATED CONTAINER

[75] Inventors: Barry P. Cahill-O'Brien; Michael W. Nevin, both of Syracuse; Richard L. Martin, Cicero, all of N.Y.

[73] Assignee: Carrier Corporation, Syracuse, N.Y.

[21] Appl. No.: 259,840

[22] Filed: Jun. 15, 1994

[51] Int. Cl.[6] .................................................... F24F 3/16
[52] U.S. Cl. ................................. 62/78; 62/127; 62/179; 99/468; 422/40; 426/419
[58] Field of Search ................................ 62/78, 130, 126, 62/127, 178, 179, 131, 129; 99/467, 468; 422/40, 111; 426/418, 419, 312

[56] References Cited

U.S. PATENT DOCUMENTS

| | | | |
|---|---|---|---|
| 3,508,881 | 4/1970 | Hagenauer et al. | 422/40 X |
| 4,716,739 | 1/1988 | Harris et al. | 62/78 |
| 4,817,391 | 4/1989 | Roe et al. | 426/419 X |
| 4,829,774 | 5/1989 | Wassibauer et al. | 62/179 X |
| 4,845,958 | 7/1989 | Senda et al. | 426/419 X |
| 4,894,997 | 1/1990 | Urushizaki et al. | 99/468 X |
| 4,961,322 | 10/1990 | Oguma et al. | 62/179 |
| 5,063,753 | 11/1991 | Woodruff | 62/78 X |
| 5,332,547 | 7/1994 | Olson et al. | 422/40 X |
| 5,355,781 | 10/1994 | Liston et al. | 99/468 X |

Primary Examiner—Harry B. Tanner

[57] ABSTRACT

A method for controlling operation of a system for controlling the atmosphere within a confined space. The system has an electrical control having a display and electrically controlled components. The components include an air compressor, a filter, an air heater, a separator for dividing air into streams of oxygen and nitrogen, and flow control valves for varying the purity of the nitrogen stream. The system also includes sensors for indicating the temperature leaving the heater and the temperature within the confined space. A sensor indicates the pressure upstream of the control valves. An oxygen sensor and a carbon dioxide sensor are included. The method includes the steps of energizing the system and simultaneously operating the electrical control to perform the steps of: (1) operating the compressor to an on or off position responsive to inputs from the oxygen sensor and the carbon dioxide sensor; (2) operating the flow control to achieve setpoint oxygen and carbon dioxide levels in the atmosphere, in response to inputs from the oxygen sensor and the carbon dioxide sensor; (3) operating the air heater to maintain a preset value; (4) monitoring the oxygen sensor, and, compensating the output when a predetermined temperature of the atmosphere is indicated; (5) monitoring the carbon dioxide sensor, and compensating the output when a predetermined change in the temperature of the carbon dioxide sensor occurs; and (6) monitoring system components, and, indicating on the display when unsafe or out of range conditions occur.

7 Claims, 13 Drawing Sheets

SETPOINT/CODE    GAS CONCENTRATION/DATA

MAIN CA ALGORITHM

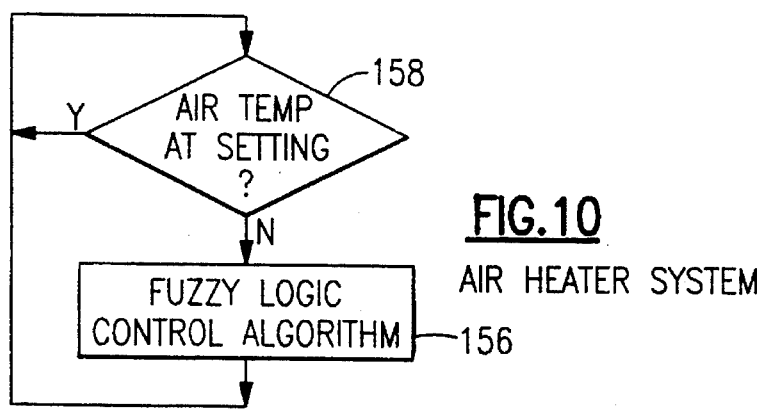
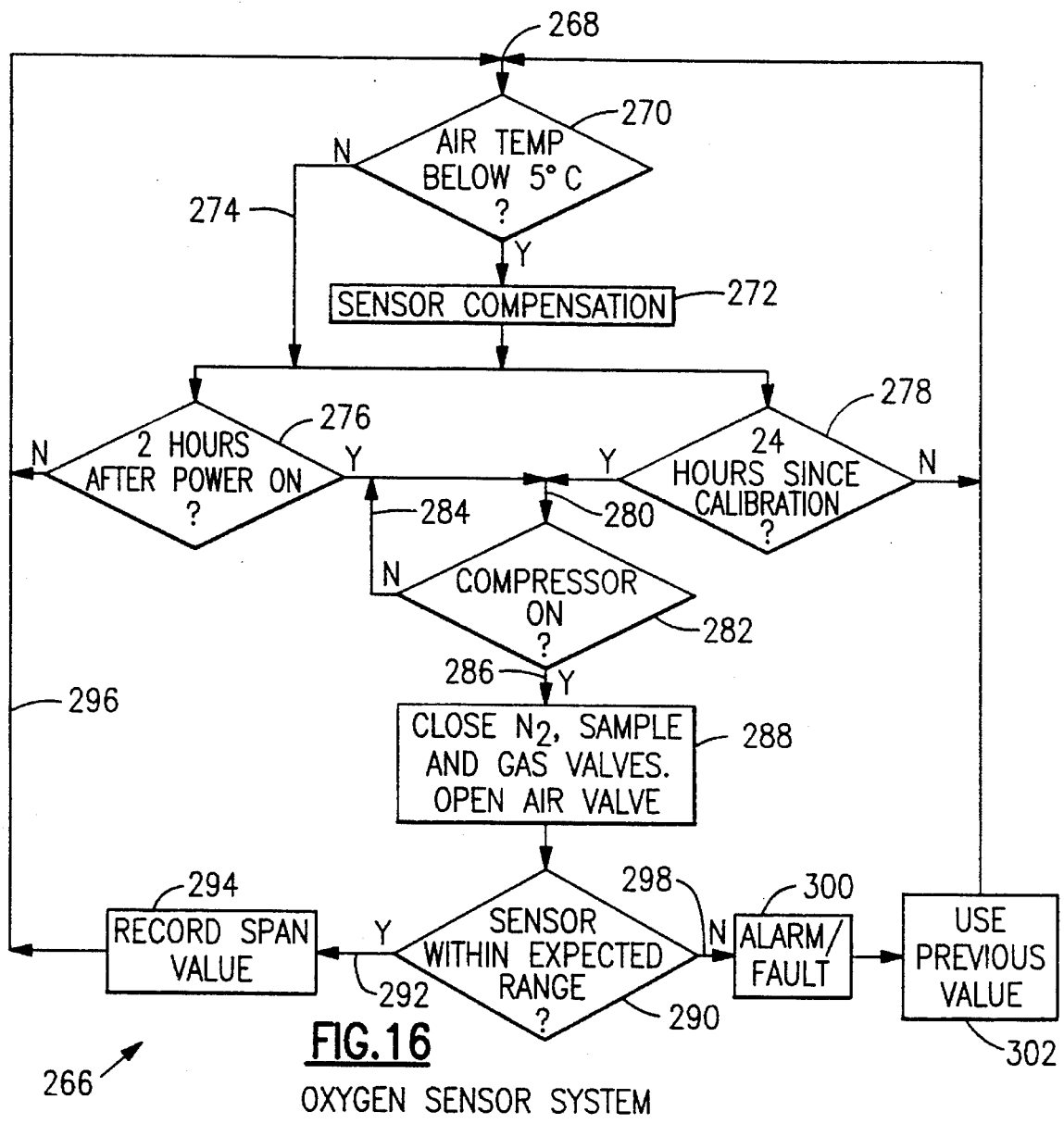

COMPRESSOR CONTROL SYSTEM

O2/CO2 CONTROL FLOW

* START COMPRESSOR ONLY IF STOPPED

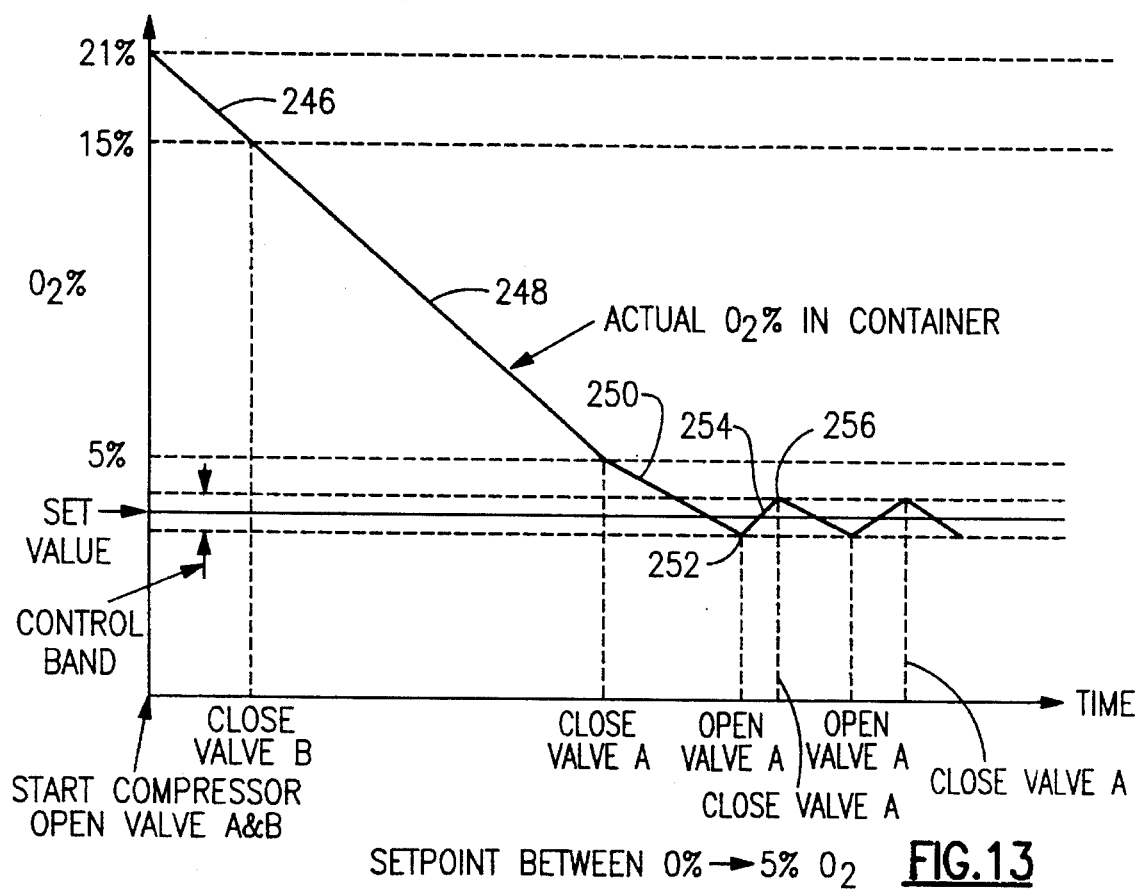
FIG.13 SETPOINT BETWEEN 0% → 5% $O_2$
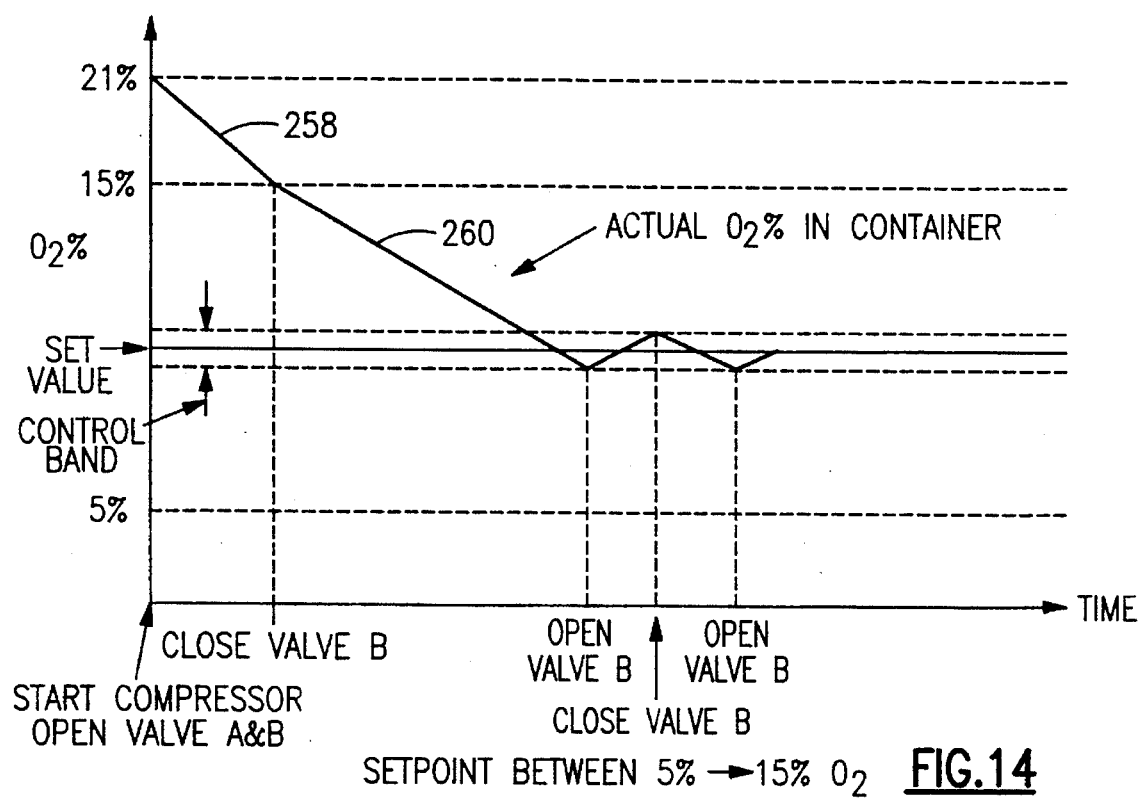
FIG.14 SETPOINT BETWEEN 5% → 15% $O_2$

CO2 SENSOR SYSTEM 5,457,963

CONTROLLED ATMOSPHERE SYSTEM FOR A REFRIGERATED CONTAINER

BACKGROUND OF THE INVENTION

1. Field of the Invention

The invention relates to a controlled atmosphere system for a refrigerated container and specifically to a system for regulating the amount of nitrogen, oxygen, and carbon dioxide inside a refrigerated container resulting in an atmospheric composition that extends post harvest shelf life/or quality of fruits and vegetables.

2. Description of the Prior Art

Controlled atmosphere containers for the post-harvest transport and storage of agricultural commodities are well known in the art. Such systems are usually used in conjunction with a refrigeration unit designed to lower the temperature of the interior of the container to a desired optimum temperature for the load being shipped therein. It has been established that temperature is the most important factor in controlling the rate of deterioration of fruits and vegetables. A controlled atmosphere system is considered as a supplement to proper temperature and humidity control.

The purpose of a controlled atmosphere system is to control the amount of oxygen and carbon dioxide inside the refrigerated container to change the rate of ripening of the produce stored in the container. The system controls the amount of oxygen ($O_2$) and carbon dioxide ($CO_2$) by replacing them with nitrogen ($N_2$).

In early examples of controlled atmosphere systems for refrigerated containers, the modified atmosphere within the container was established, after loading, and not further modified during the period of storage or transportation. Problems with such systems included leakage both into and out of the container which changed the atmosphere. Subsequent technologies have provided for monitoring of oxygen and carbon dioxide levels within the container and have provided nitrogen and carbon dioxide sources to allow modification of the atmosphere during storage and transportation. A drawback to such systems was that supplies of carbon dioxide and nitrogen gas were required to maintain the desired atmosphere during normal lengths of transportation. Such gas sources were bulky and heavy and were not economically feasible to provide the gases required in a typical commercial application.

Systems have been developed wherein extremely high purity nitrogen gas is generated using an air separator of a type which incorporates membranes to divide a stream of ambient air, under pressure, into its principal constituents of oxygen and nitrogen. Some of such systems utilize an electronic controller to electrically operate a valve which will selectively increase or decrease the amount of nitrogen delivered from the membrane separator to the refrigerated container.

In such systems it is desirable for the controlled atmosphere system to be more widely used by unskilled operators. In order to facilitate this goal it is desirable to have a microprocessor controlled system which provides enhanced system performance, ease of setup and use and self-diagnostics. To this end it is particularly desirable to have a controller which operates according to a specific control algorithm including algorithms which energize the compressor, the heater, the system control valves and other system components in order to maintain the gas concentration inside the container box.

SUMMARY OF THE INVENTION

According to the present invention a method is provided for controlling operation of a controlled atmosphere system for controlling the atmosphere within a confined space. The system has an electrical control which has a display and electrically controlled components. The components include in serial relationship, an air compressor, a filter having a drain valve, an air heater, a nonelectric separator for dividing air into separate streams comprising its principal constituents of oxygen and nitrogen, and, two or more flow control valves in parallel flow relationship for varying the purity of the nitrogen stream. The system also includes temperature sensors for indicating the temperature leaving the heater and the temperature of the atmosphere within the confined space. A system pressure sensor for providing the pressure upstream of the control valves is included. The system further includes an oxygen sensor for generating an output indicating oxygen level in a gas and a carbon dioxide sensor for indicating carbon dioxide level in a gas. The method includes the steps of energizing the controlled atmosphere system and simultaneously operating the electrical control to perform the steps of: (1) operating the compressor to an on or off position responsive to inputs from the oxygen sensor and the carbon dioxide sensor; (2) operating the flow control to achieve setpoint oxygen and carbon dioxide levels in the atmosphere, in response to inputs from the oxygen sensor and the carbon dioxide sensor; (3) operating a control for the air heater to maintain the output therefrom at a preset value; (4) monitoring the oxygen sensor, and, automatically compensating the output when a predetermined temperature of the atmosphere is indicated; (5) monitoring the carbon dioxide sensor, and, automatically compensating the output when a predetermined change in the temperature of the carbon dioxide sensor occurs; and (6) monitoring the status of certain system components relative to safety and other operating parameters, and, indicating on the display when said parameters are unsafe or out of an expected range.

BRIEF DESCRIPTION OF THE DRAWINGS

For a better understanding of these and other objects of the present invention reference is made to the detailed description of the invention which is to be read in conjunction with the following drawings, wherein:

FIG. 10 is a simplified flow chart of a software program residing in the microprocessor of the controlled atmosphere controller which controls the air heater of that system;

FIG. 13 is a graphical representation of the mode of operation of the oxygen flow control system between setpoints of 0% to 5% oxygen;

FIG. 14 is a graph similar to FIG. 13 for oxygen setpoints between 5% and 15%;

FIG. 16 is a flow chart of a software program residing in the microprocessor of the controlled atmosphere controller relating to temperature compensation and calibration of the oxygen sensor system.

DESCRIPTION OF THE PREFERRED EMBODIMENT

Figure 1:
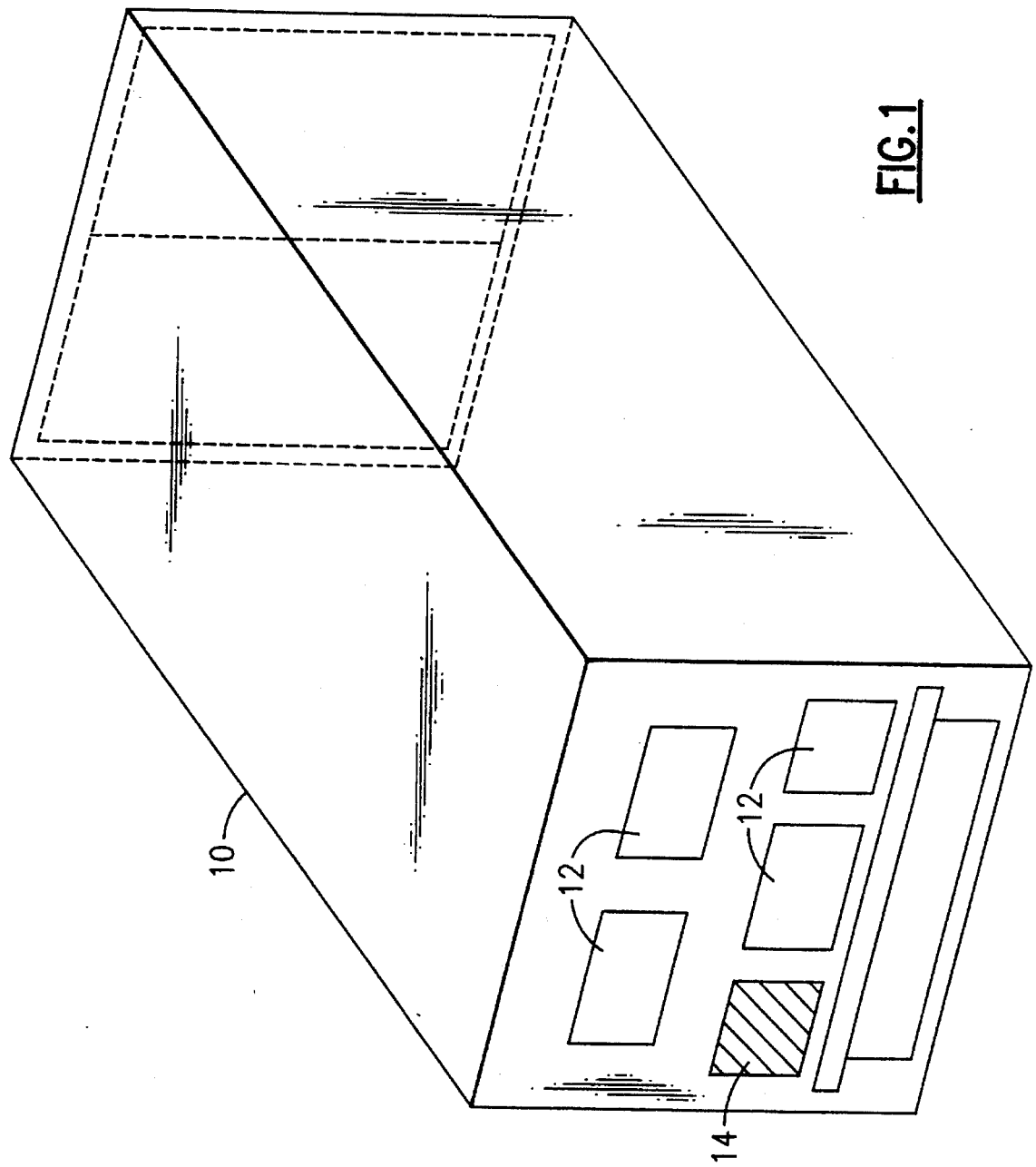
FIG. 1 is a simplified perspective view of a refrigerated transport container of the type for use with the present invention.

Referring first to FIG. 1 a refrigerated container 10 is shown which has associated therewith an integrated electrically operated refrigeration system, comprising several components 12, and, a controlled atmosphere system, a part of which 14 is shown. The refrigeration system 12 and the controlled atmosphere system are mounted at one end of the container and are adapted to regulate the temperature, and the atmosphere, respectively within the container 10.

Figure 2:
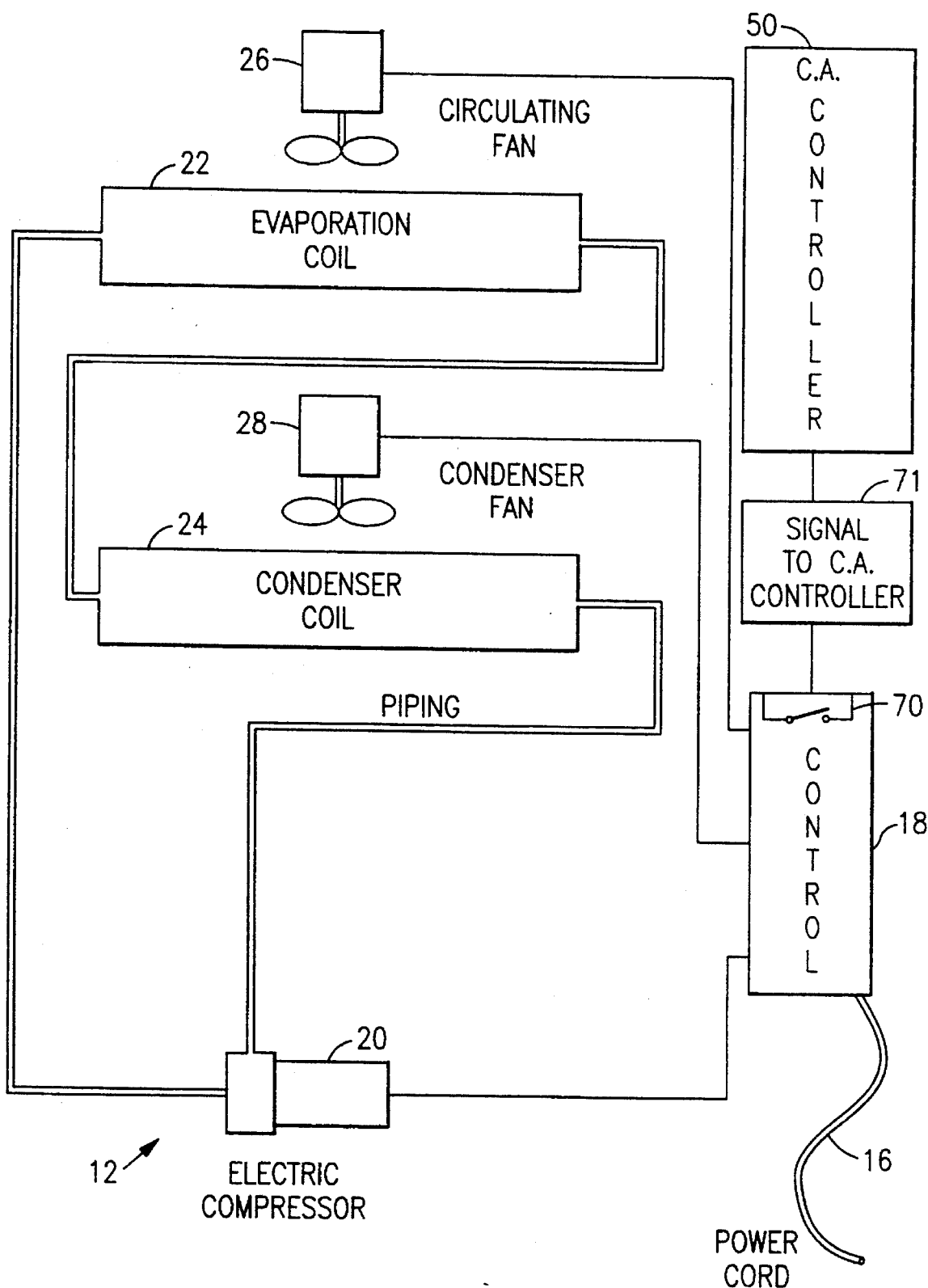
FIG. 2 is a schematic representation of a refrigeration unit of the type used in the container of FIG. 1.

With reference to FIG. 2 the refrigeration system 12 comprises a vapor compression refrigeration system which is well known in the prior art for such application. Briefly, the system includes an electrical power cord 16, providing electrical power to a refrigeration system controller 18. The controller 18 is preferably a programmed microprocessor which is adapted to receive inputs from the system operator and from various sensors in the refrigeration system and thereby control the operation of the refrigeration system components, in a manner which is well known in the art. The refrigeration system comprises a refrigeration circuit including an electrically driven compressor 20 communicating in turn with an evaporator coil 22, and a condenser coil 24. Appropriate evaporator fans 26 are provided to recirculate the atmosphere within the container 10 over the evaporator coil 22 and into the container where it is appropriately circulated and returned to the evaporator coil for further cooling, again as is conventional. A condenser fan 28 is provided to direct a cooling flow of atmospheric air over the condenser coil 24 to facilitate rejection of heat removed from the container 10. The refrigeration system controller 18 operates the various components, to maintain a selected set point temperature within the container as is conventional.

Figure 3:
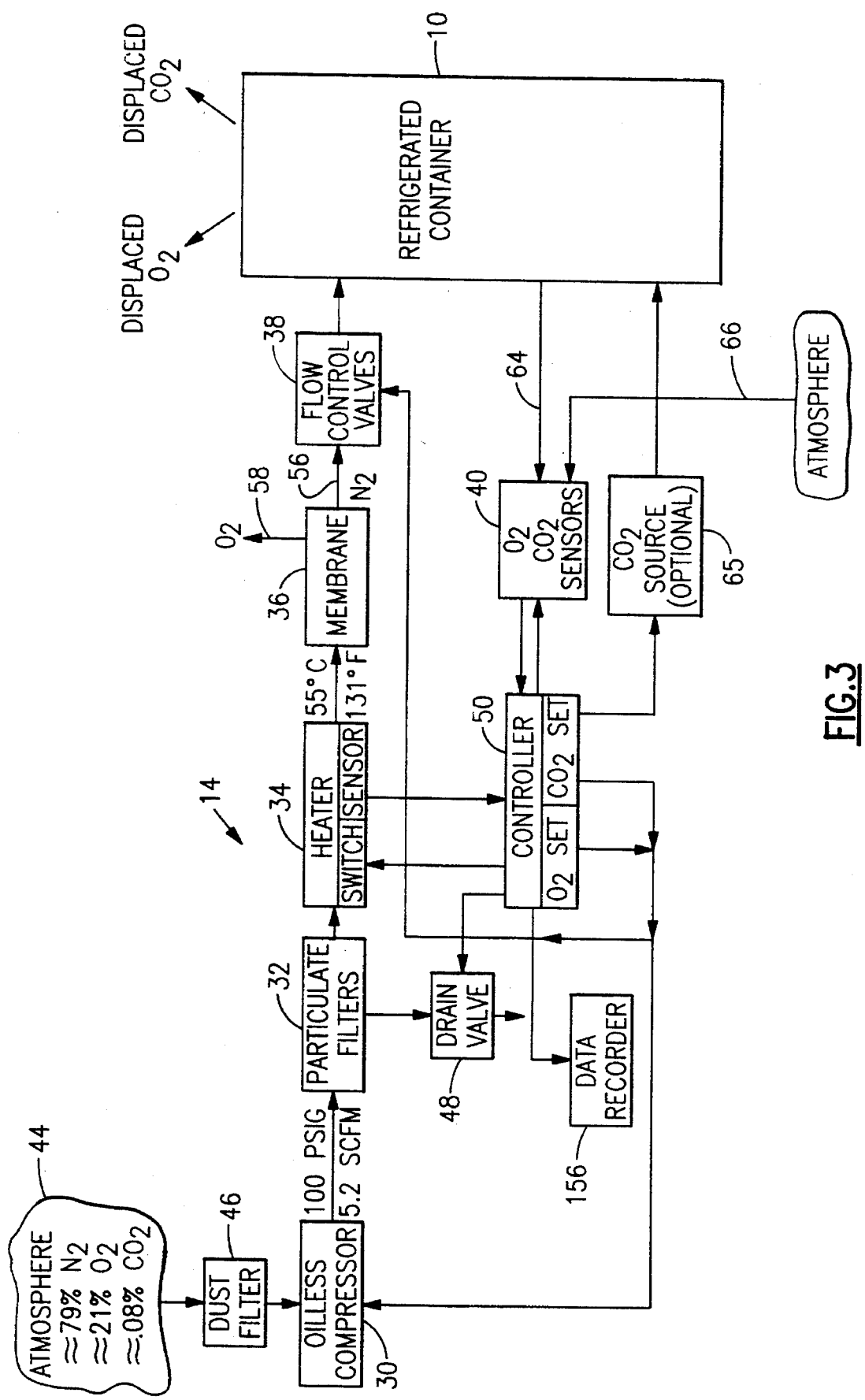
FIG. 3 is a block diagram of a controlled atmosphere system to be used in conjunction with the container unit shown in FIG. 1.

The controlled atmosphere system 14 is illustrated in more detail in FIG. 3. The basic components of the controlled atmosphere system are an air compressor 30, a filter 32, an air heater 34, a nitrogen separation membrane 36, a system of metering valves 38, gas sensors 40 and a controller 50.

The purpose of the controlled atmosphere system is to control the amount of oxygen and carbon dioxide inside the refrigerated container 10 to change the rate of ripening of produce stored in the container. The system controls the amount of oxygen ($O_2$) and carbon dioxide ($CO_2$) by replacing it with nitrogen generated from the membrane 36.

With continued reference to FIG. 3, when the controlled atmosphere system 14 is running, air 44 from outside the container enters the compressor 30 through a dust filter 46. The atmospheric air is then compressed to a high pressure by the compressor 30. The high pressure air is then filtered by the particulate filter 32 to remove moisture and dirt before passing to the air heater 34. A normally closed drain valve 48 is provided on the filter 32. The drain valve 48 is adapted to be electrically opened when energized by the controlled atmosphere system controller 50. The controller is programmed to periodically open the drain value 48, for a short time, to remove residue which may build up in the filter 32.

High pressure air from the filter 32 passes to the air heater 34 where it is heated to the optimum operating temperature for the membrane 36 being used in the system. As indicated in the drawing the heater output is controlled to 55° C./131° F. This is the optimum operating temperature for a membrane separator 36 available as a Model 4241 Permeator from a company known as MEDAL MEMBRANE SEPARATION SYSTEMS DUPONT AIRLIQUIDE. The controlled atmosphere controller 50 receives inputs from a temperature sensor 52 and controls energization of a heater switch 54 to maintain the temperature of the compressed air leaving the air heater.

The warmed, high pressure air passing from the heater 34 enters the membrane 36, where it is separated into high purity nitrogen, which passes from the nitrogen outlet 56, and oxygen/and other gases which are passed to the oxygen outlet 58. The rate of separation occurring in the membrane separator 36 depends on the flow of air through the membrane. This flow rate is controlled by the pressure in the nitrogen outlet 56. The higher the pressure in the nitrogen outlet 56, the higher the nitrogen purity generated, and the lower the flow rate of nitrogen. The membrane 36 is capable of generating nitrogen purity levels greater than 99 percent. As the pressure in the nitrogen outlet 56 falls, the purity level of the nitrogen falls, and the flow rate increases.

The nitrogen enriched gas passing from the membrane through the outlet 56 passes to the flow control valves 38. The oxygen/other gasses from the oxygen outlet 58 are exhausted to the outside air.

The pressure on the nitrogen outlet 56 of the membrane 36 is regulated by the aforementioned flow control valves 38. To control the percentage of nitrogen present in the container, the controller 50 is programmed to cycle the flow control valves 38 to increase or decrease the amount of nitrogen in the container as required. The controller 50 may also add $CO_2$ from an external $CO_2$ source 65 if desired.

The controller 50 monitors the amount of oxygen and carbon dioxide in the container, using oxygen and carbon dioxide gas concentration sensors 40 via a sample line 64. Periodic calibration of the sensors to correct drifts with time and temperature require sampling outside air via line 66.

In normal operation, following loading of the container, and connection of the power cord 16 to an appropriate power source the refrigeration system controller 18 is energized and programmed to a desired set point temperature for the load. At the same time the controller 50 for the controlled atmosphere system is energized and set for the desired oxygen and carbon dioxide ranges for the load.

With both the refrigeration system 12 and the controlled atmosphere system 14 energized and suitably programmed the refrigeration system will begin immediate operation according to its programmed operation. The controlled atmosphere system 14 however, will begin operation only when a controlled atmosphere enable switch 70 located in the refrigeration controller 18 is closed. The enable switch 70 is closed by the refrigeration system controller 18 when it determines that the operating conditions of the refrigeration system, and conditions within the refrigerated container 10 are such that it is acceptable to allow the controlled atmosphere machine to operate.

The system described above in connection with Figure is representative of a typical prior art system and is meant to give an understanding of the overall principals of operation of such a system. Looking now to FIG. 4 a schematic diagram of a controlled atmosphere system according to the present invention as installed in a container refrigeration unit will now be described in detail. For reference purposes it should be understood that the broken lines in the schematic are used to generally define different parts of the refrigerated/controlled atmosphere refrigeration container unit and thus are useful in describing the location of various components with respect to these parts of the unit. First the enclosed portion defined by the broken line 68 on the left hand portion represent the interior of the refrigerated container box 10. The portion to the right of the interior of the box, identified by numeral 70, represents the evaporator section of the combined refrigeration/controlled atmosphere unit mounted to the end of the container. It should be appreciated that the atmosphere in the evaporator section 70 is the same as the atmosphere within the container box as the circulating fans 26 of the refrigeration unit 12 recirculate the air between these sections. The right hand portion of the schematic as defined by the lines 72 is the condenser section of the combined container refrigeration controlled atmosphere unit.

It will be appreciated that the condenser section is in direct contact with the normal atmosphere, with the condenser section 72 and the evaporator section 70 are separated by a substantially fluid tight barrier represented by line 74.

The system of FIG. 4 will be described using the reference numerals used in FIG. 3 where appropriate. Looking now at FIG. 4 in detail the intake air filter 46 is located in the condenser section 72 so as to receive outside atmospheric air. An appropriate inlet conduit 76 is in fluid communication with a two cylinder air compressor 30 which has an outlet conduit 78 for high pressure compressed air discharged therefrom. An overtemperature switch 80 is provided on the air compressor motor to direct a signal to the controlled atmosphere controller 50 should the compressor reach an unsafe temperature.

The outlet conduit 78 from the compressor communicates with a tortuously shaped condensing coil 81 which serves to cool the high pressure high temperature air discharged from the compressor and to condense moisture contained therein to a liquid state. From the condensing coil 81 conduit 82 passes from the evaporator section through barrier 74 into the condenser section 72. Located in the conduit 82 is a Schrader valve 84 which facilities servicing of the system as for example conducting a pressurized leak check. Also located in conduit 82 is a pressure relief valve 86 designed to protect the air compressor should a high back pressure develop in the system which could damage the compressor 30.

Downstream from the pressure relief valve 86, in conduit 82, is the air filter 32 for filtering the high pressure air discharged from the compressor 30. In the preferred embodiment this filter is actually two separate filters, a primary discharge air filter 90 for large contaminants and a secondary discharge air filter 92 for fine particulate contaminants. Each of the filters 90 and 92 is provided with a filter media which is replaceable on a periodic schedule. Each filter 90, 92 is also provided with a drain solenoid valve 94. These electrically operated valves are normally closed and are adapted to be periodically opened by the controlled atmosphere controller 50 on a periodic schedule, for a short period of time, to remove residue built up in the filter.

Conduit 96 communicates the outlet of filter 92 with the inlet of the air heater 34. As previously discussed the air heater is controlled by the system controller 50 to maintain the optimum temperature for the membrane separator 36 utilized in the system. Heater operation is controlled by the system controller by way of a program which uses inputs from the desired set point temperature and from an air temperature sensor 52 which is located in the conduit 100 which communicates the outlet of the air heater 34 with the inlet of the membrane 36. Air heater temperature control inputs from the controller 50 cycle a solid state heater switch 54 located adjacent to the heater. As will be seen, the heater 54 is on whenever the compressor 30 is on. As shown in FIG. 10, the actual heater control output is determined by a "Fuzzy logic" algorithm 156 which responds to inputs from the sensor 52 as shown at step 158.

As previously described the membrane separator 36 has an oxygen outlet 58 which extends from the separator through the barrier 74 to discharge oxygen and other gases to the outside atmosphere. The nitrogen outlet 56 also extends through the barrier 74 into the condenser section 72 where it communicates with the flow control or metering valve system 38. Located in the nitrogen outlet conduit 56 is a pressure transducer 98 which provides a pressure input to the controlled atmosphere controller 50. An air pressure gage 102 is also illustrated in the nitrogen outlet line 56 to provide a visual reading of nitrogen pressure in the outlet line 56.

The flow control valve system 38 comprises three separate metering devices arranged in a parallel fluid flow relationship. As will be seen, these devices cooperate to control the flow of nitrogen to a nitrogen delivery line 106 which passes through the barrier 74 into the evaporator section 70. The nitrogen delivered by line 106 is then circulated by the fans 26 of the refrigeration system to the interior 68 of the container box 10. A flow meter 108 is shown in the nitrogen delivery line which will provide a visually perceptible reading of the nitrogen flow from the flow control valve system 38 to the container.

The flow control valve system comprises two solenoid valves designated A and B and a fixed orifice 104, which in the preferred embodiment is a capillary tube. The flow control solenoid valves A and B are normally closed and are selectively opened and closed in response to the control algorithm from the controlled atmosphere system controller 50 to adjust the purity of nitrogen generated by the membrane 36.

In the preferred embodiment, with both valves A and B open, flow is through all three metering devices and the membrane will produce an output of approximately 15 percent oxygen and 85 percent nitrogen. This is defined as the low purity, high flow condition. With one valve, (A or B) open the system will produce approximately 5 percent oxygen and 95 percent nitrogen. This is defined as the medium purity, medium flow condition. With both valves A and B closed, the system will produce approximately 0.5 percent oxygen and 99.5 percent nitrogen. This is defined as the high purity, low flow condition. As will be seen, the control algorithm uses this for the system oxygen value as its primary control input.

Also located in the evaporator section 70, above the circulating fan 26, are the gas sensors 40. The sensors include an oxygen sensor 110 which is used to measure the concentration of oxygen inside the container. The oxygen sensor used in a preferred embodiment of the system is a galvanic fuel cell. When a gas sample is passed through the galvanic cell, oxygen reacts with the cell to produce a small voltage. The voltage output is directly proportional to the oxygen concentration. The controller 50 converts the voltage output to a percent oxygen readout on the digital display which will be described hereinbelow. A model KE-50C Galvanic cell oxygen sensor available from the Japan Storage Battery Company, Ltd. is used in a preferred embodiment of the system. Also included is a $CO_2$ sensor 112 which is used to measure the concentration of carbon dioxide inside the container. The $CO_2$ sensor is what is known as a non dispersive infrared (NDIR microbench $CO_2$ sensor, available as part number 032 from Sensors Inc. The $CO_2$ sensor has an internal temperature sensor which generates a signal which is also delivered to the controller. The sensor generates a signal which is converted by the controller 50 to a percent $CO_2$ readout on the digital display. The $O_2$ and $CO_2$ sensors 110, 112 are in serial fluid flow relationship in a gas sampling line 114. Downstream from the sensors is a discharge line 115 open to the evaporator section of the unit, while upstream is a gas sample filter 116.

Four electrically actuated solenoid valves may be selectively actuated to provide the desired gas sample flow to the inlet line 118 to the sensors 40. A first solenoid valve 118 is located in an air sample line 120 which is adapted to deliver a sample of the warm air from the inlet line 100 to the membrane 36. A capillary tube or other pressure drop device 123 is provided in this line as the air supply line is at high pressure.

A second solenoid valve 122 is positioned in a nitrogen sample supply line 124 which communicates with the nitrogen delivery line 106. A third solenoid valve 126 is located in a calibration gas delivery line 128. The calibration gas delivery line communicates with a suitable gas fitting 130 located on the outside of the condenser section 72. It is adapted to be connected with a calibration gas tank 131 which contains a calibration gas made up of 5 percent $CO_2$ and 95 percent nitrogen. For safety purposes a pressure relief valve 132 is provided in the calibration gas line 128. Finally the fourth solenoid valve 134 is located in the sample line 64 which is adapted to deliver a sample of the gas within the container 10 to the gas sensors. It should be appreciated that each of these solenoid valves is selectively actuated by the control atmosphere system controller 50. In a like manner, the outputs from the $O_2$ sensor 110 and the $CO_2$ sensor 112 are delivered to the system controller to monitor the operation and performance of the system as will be appreciated.

Figure 4:
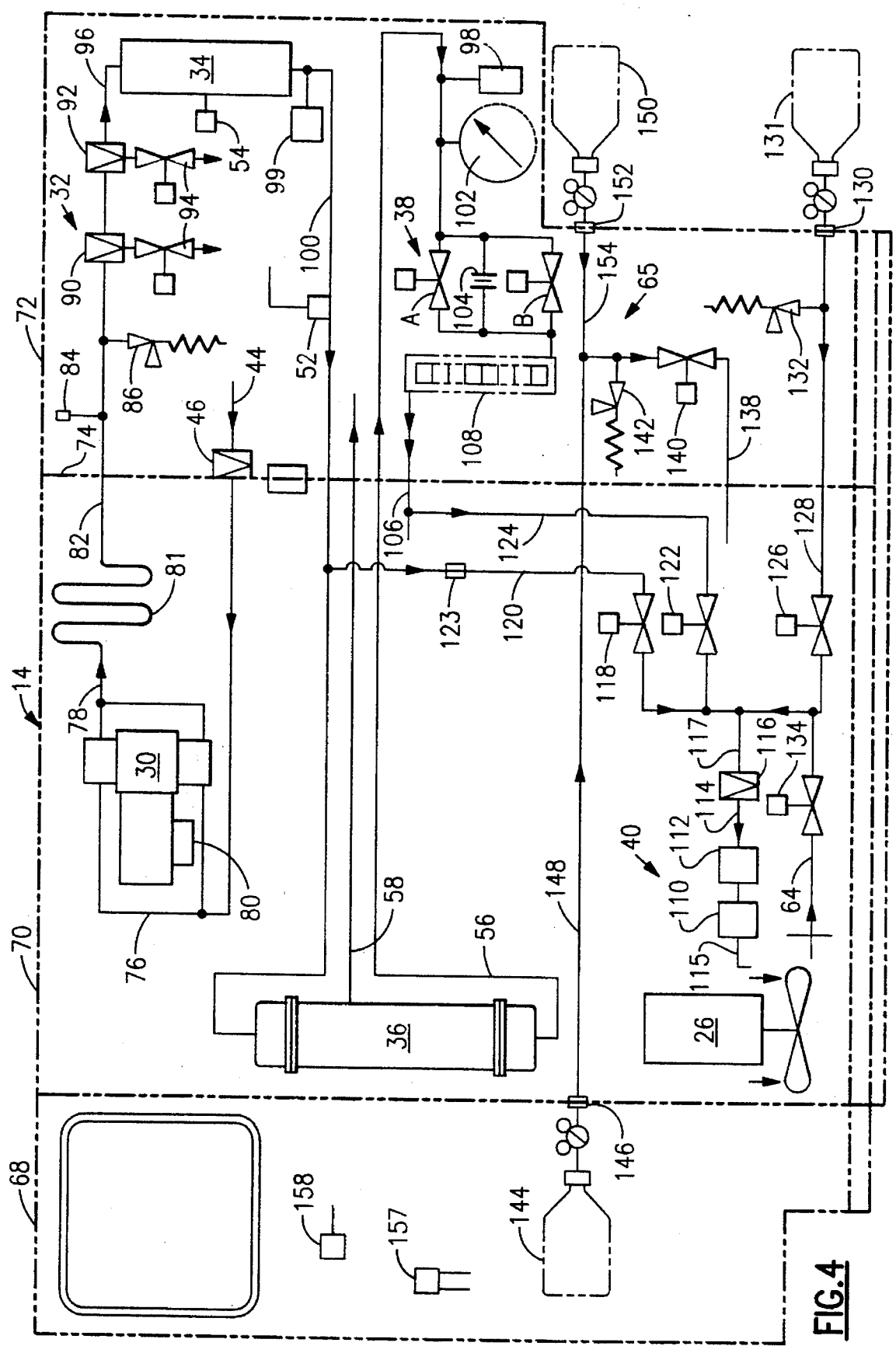
FIG. 4 is a schematic diagram of a preferred embodiment of a controlled atmosphere system of the type generally shown in FIG. 3.

With continued reference to FIG. 4 the system is provided with a $CO_2$ supply system generally identified by reference numeral 65. The system includes a $CO_2$ delivery line 138 which has a normally closed electrically actuated solenoid valve 140 positioned therein. A pressure relief valve 142 is also provided in the $CO_2$ supply line 138. In the illustrated embodiment two locations for $CO_2$ supply bottles are shown. The first is in the interior 68 of the container box wherein a $CO_2$ bottle 144 is shown in communication with an appropriate fitting 146 and a supply line 148 to the $CO_2$ system. A second $CO_2$ bottle 150 located outside of the entire unit communicating through a fitting 152 and a line 154 to the $CO_2$ system 65.

The $CO_2$ supply system is physically separate from the rest of the controlled atmosphere system and is actuated as needed by the control atmosphere controller 50 by selective actuation of the solenoid valve 140. Located within the interior 68 of the container 10 is a door safety interlock solenoid 156. This solenoid is associated with an interlock mechanism which will prevent the doors to the container form being opened when the oxygen level in the container falls below a predetermined value.

Figure 5:
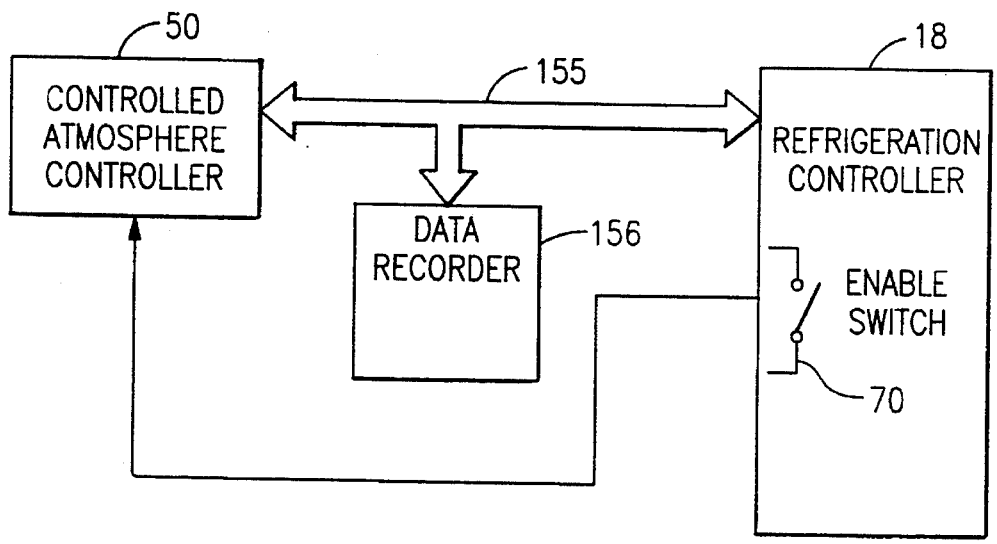
FIG. 5 is a block diagram showing the relationship between the controllers of the refrigeration and controlled atmosphere systems.

In order for the integrated refrigeration/controlled atmosphere system to operate according to the present invention it is necessary that the controller 18 of the refrigeration system and the controller of the controlled atmosphere system 50 be able to communicate electronically with one another. One example of such communication is the over riding control of the refrigeration controller 18 by the enable switch 70, briefly described hereinabove, which is the subject of a co-pending application. This relationship between the controllers 18 and 50 is shown schematically in FIG. 5 wherein the solid arrows 155 interconnecting the controllers and electronic data recorder 156 are meant to illustrate the ability of these components to electronically communicate with one another.

The data recorder 156 serves to periodically record, for future reference, information from both the refrigeration controller and the controlled atmosphere controller. Information recorded from the refrigeration controller typically includes temperature of supply and return air being circulated. Information recorded from the controlled atmosphere controller includes $O_2$ and $CO_2$ levels, the result of pre-trip tests, alarm activity, and the state of the enable switch 70.

Figure 6:
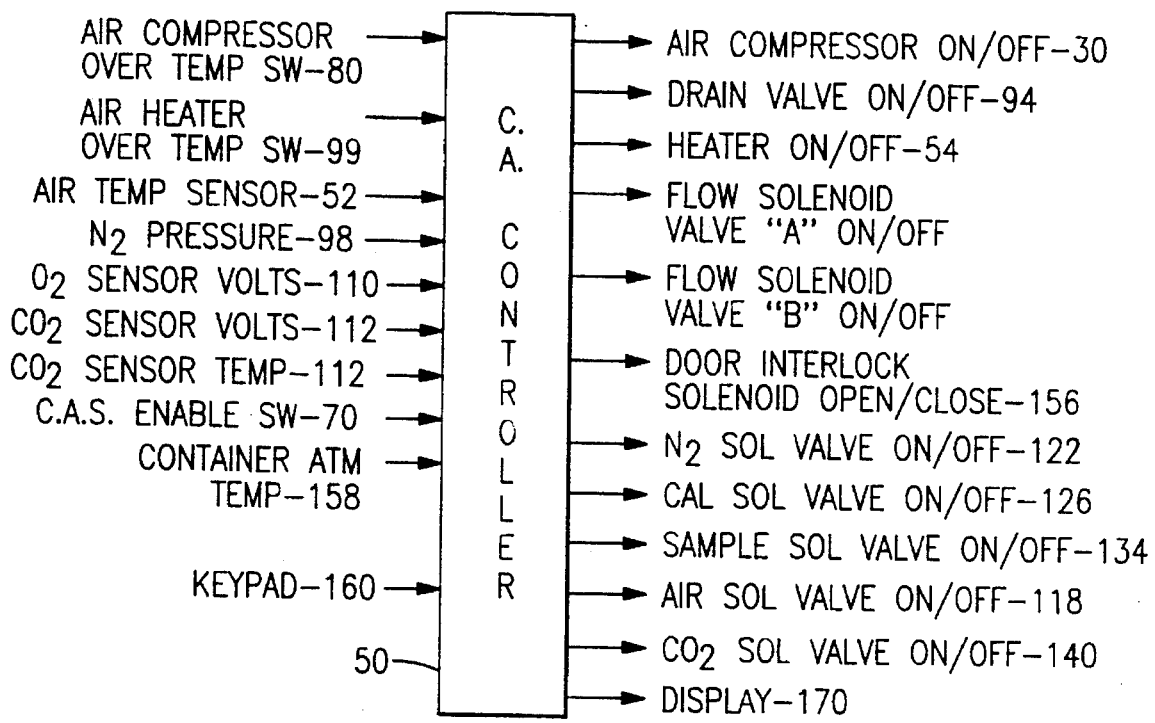
FIG. 6 is a simplified representation of the controlled atmosphere controller showing the inputs and outputs as they relate to the system illustrated in FIG. 4.

For convenience in understanding the role of the controlled atmosphere controller 50 in controlling all of the components of the system illustrated in FIG. 4, FIG. 6 generally illustrates the controller 50 and the inputs and outputs thereto/therefrom. Each of the inputs is identified and the corresponding reference numeral in FIG. 4 is also used. The container atmosphere temperature input is derived from a temperature sensor 157, not previously mentioned, located within the enclosed space 68 of the container 10. The key pad 160 inputs will be described below in connection with FIG. 7. All of the other inputs have been discussed above in connection with the description of the system shown in FIG. 4. The outputs from the controlled atmosphere controller 50 are likewise each described along with the relevant reference numeral used in FIG. 4. Again each of these components has been described previously and will not be further elaborated upon at this time.

Figure 7:
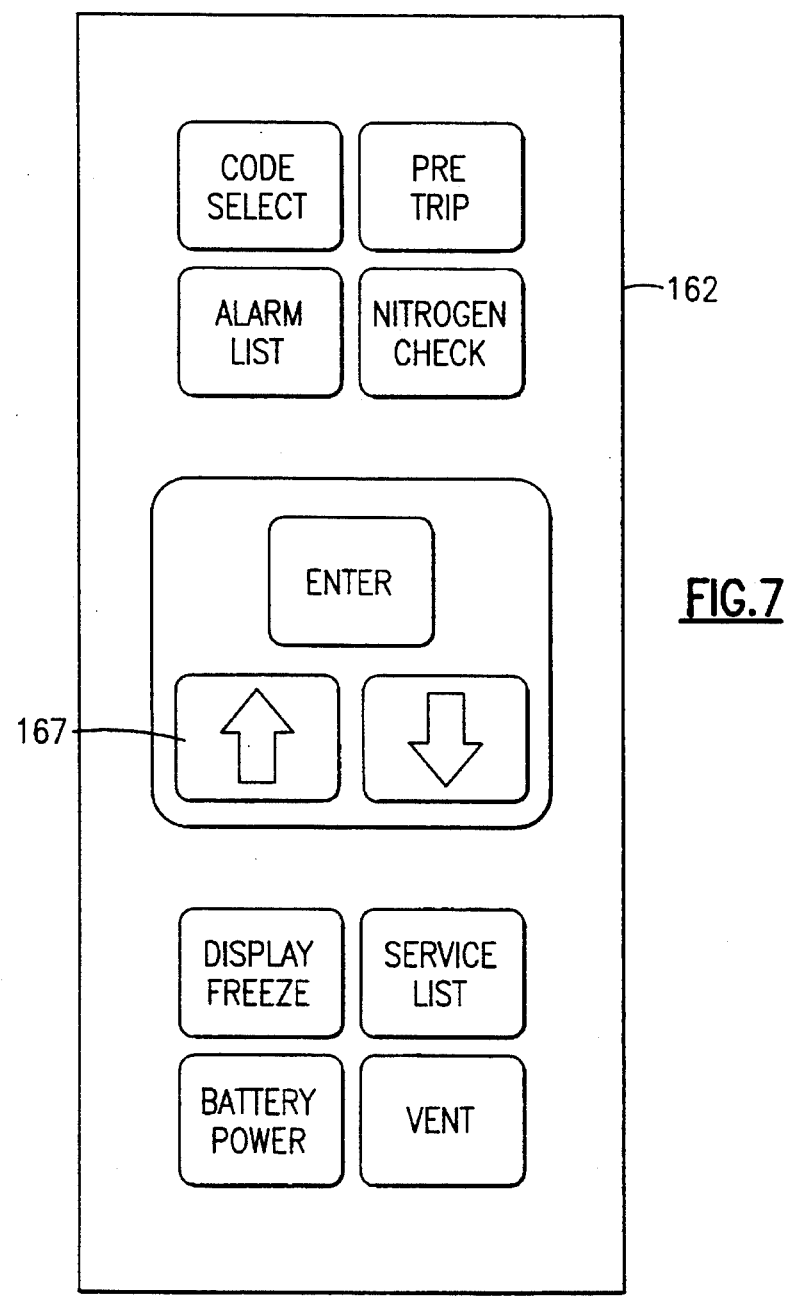
FIG. 7 illustrates the appearance of the input key pad for the controlled atmosphere controller of the present invention.

FIG. 7 illustrates the appearance of the key pad 160 which provides operator inputs to the controller 50. Most of the input buttons on the key pad 160 are not necessary to an understanding of the present invention and will not be described herein. When deemed necessary for a full understanding of a function, the buttons will be described at that time.

Figure 8:
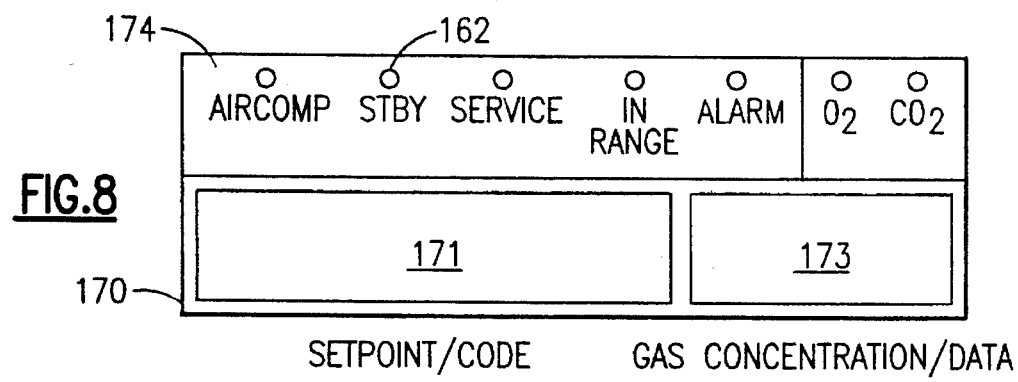
FIG. 8 is an illustration of the display associated with the controlled atmosphere controller.

FIG. 8 represents the display 170 of the controlled atmosphere controller 50. Across the top of the display are a series of seven indicator lights 174 useful in conveying information to the operator during operation of the system. At the bottom of the display are two alphanumeric LCD visual display regions. The left hand display 171 and the right hand display 173 are useful in conveying information to the operator as will be appreciated.

Operation of the controlled atmosphere control algorithm which is shown generally as reference numeral 160 in FIG. 9 will be described in connection with the actual operation of the system as described in detail hereinabove. Briefly, repeating what was mentioned above, with the refrigeration system 12 and the controlled atmosphere system 14 energized and suitably programmed the refrigeration system will begin immediate operation according to its programmed operation. The controlled atmosphere system 14 however, will begin operation only when the controlled atmosphere enable switch 70 in the refrigeration controller 18 is closed. As previously indicated, the enable switch 70 is closed by the refrigeration system controller 18 when it determines that the operating conditions of the refrigeration system, and conditions within the refrigerated container 10 are such that it is acceptable to allow the controlled atmosphere machine to operate. Such conditions will be referred to in connection with the description of the various subsystems of the control algorithm for the system.

Assuming now that the refrigeration and controlled atmosphere systems are energized and that the controlled atmosphere system has been suitably programmed through keyboard 162 to set the desired setpoints to control oxygen within the range of 1% to 15% and carbon dioxide within a range of 0 to 25%. The controlled atmosphere control 18 then continuously monitors the input from the controlled atmosphere enable switch 70. If this switch 70 is closed the controlled atmosphere system will operate, if it opens, the system will immediately enter a stand-by mode. At this time the stand-by light 162 on the display 170 will be illuminated.

When in the stand-by mode, the controlled atmosphere control 50 continuously monitors the status of the controlled atmosphere enable input 71. All outputs from the controller 50 as illustrated in FIG. 6 are turned off, and the display 171, 173 is blank. On the other hand, when the CA control indicates, through the signal 71, that the controlled atmosphere system may operate the system operates according to the main controlled atmosphere algorithm 160 of FIG. 9.

The air heater control system 164 has already been briefly described hereinabove, and, as indicated is used to maintain the temperature of the air leaving the heater 34 at 55° C. The heater is on whenever the compressor 30 is operating.

Looking now to the compressor control system 166 and the flow control system 168. The operation of these systems according to the control algorithms illustrated in FIGS. 11 and 12 respectively will now be described.

Figure 11:
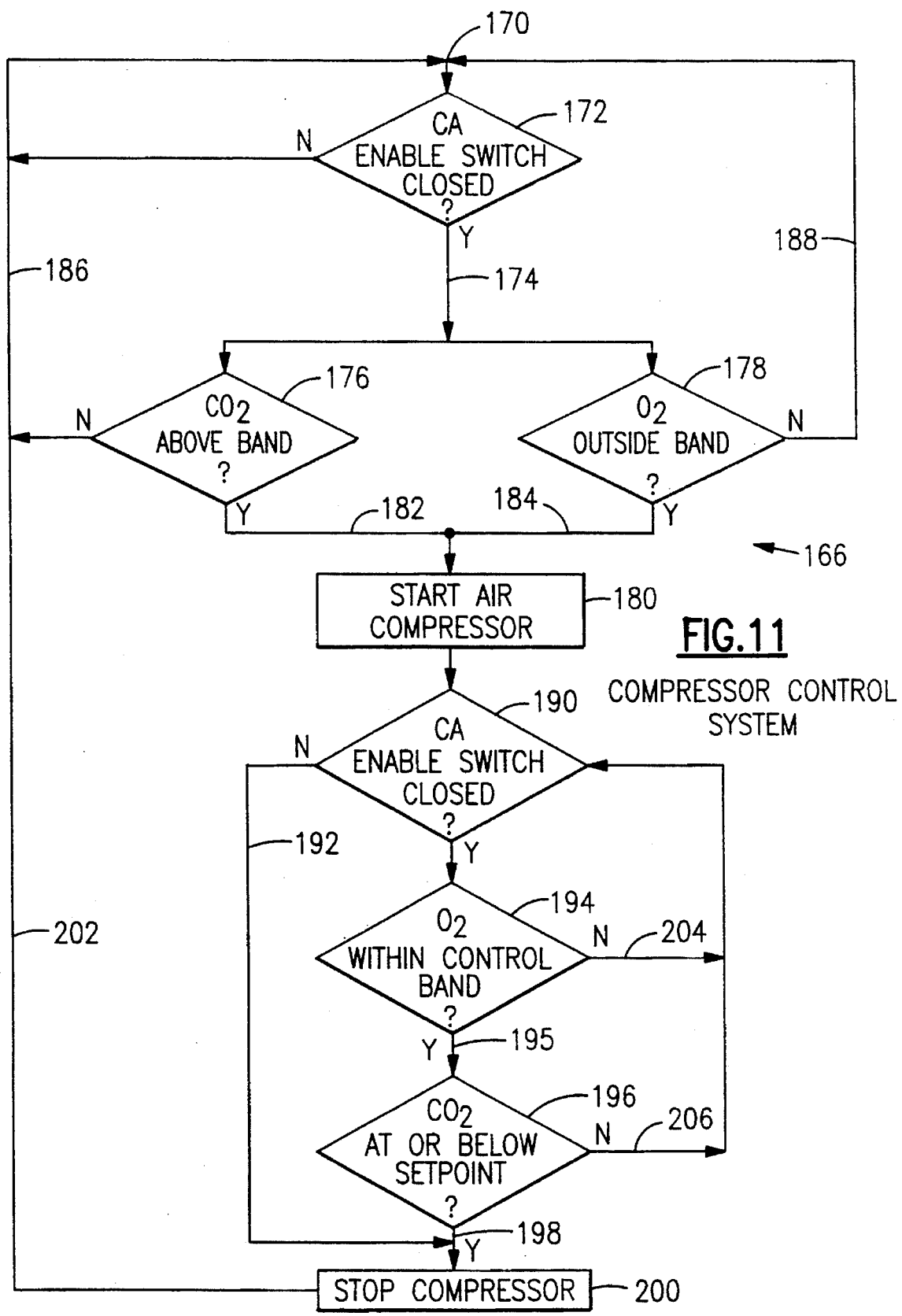
FIG. 11 is a flow chart of a software program residing in the microprocessor of the controlled atmosphere controller which controls the air compressor of that system.

Looking first at FIG. 11 the control logic for the compressor control system 166 is entered at point 170 wherein the inquiry is made as to whether the CA enable switch 70 is closed. If the switch is not closed, at step 172, no further action will be taken and the system will remain in stand-by until it is determined that the CA enable switch is closed at which point the logic will pass via the "Yes" branch 174 to evaluate the $O_2$ and $CO_2$ concentrations at steps 176 and 178 respectively. In each of these comparison steps the actual gas concentration is compared to a control band above and below the setpoint programmed into the controller for the particular gas.

With reference to step 176, when the controller determines that the $CO_2$ level is above the control band the CA air compressor 30 will be started at step 180, via the "Yes" branch 182. If step 178 indicates that the oxygen level is either above or below, i.e. "outside" the control band the air compressor 30 will be started, via the "Yes" branch 184. If neither of the conditions of step 176 or 178 are met the controller will loop, following the "No" branches, 186, 188 respectively until the conditions of steps 172, 176 and 178 result in starting of the CA air compressor at 180.

Once the decision has been made to start the air compressor at 180 the system again evaluates, at step 190 the status of the enable switch 70. If the enable switch is open the compressor is stopped, at step 200, via the "No" branch 192. If the enable switch is closed the controller then evaluates the oxygen level at step 194. If the $O_2$ level is within the control band the controller then evaluates, via the "Yes" branch 195, the $CO_2$ level at step 196. If the $CO_2$ level is below the setpoint the controller stops the compressor, via the "Yes" branch 198, at step 200. This is done because operation of the compressor has no effect on "raising" the $CO_2$ level within the container.

Upon stopping the compressor, at step 200, the controller returns via 202 to the entry point 170 of the compressor control algorithm. It should be appreciated that, following starting of the compressor at step 180, the status of the CA enable switch 70 is continuously evaluated via the "No" branches 204 and 206 respectively of steps 194 and 196 by returning to step 190. As a result the air compressor 13 stopped at step 200, via the "No" branch 192, at any time that the CA enable switch 70 is opened and the controller 50 places the controlled atmosphere system into a stand-by mode.

Whenever the compressor 30 is actuated as described above, the flow control valve system, previously described, operates, according to its control algorithm 168, to bring the oxygen level and the carbon dioxide level to their programmed setpoints. Before describing this program and the operation of the flow control valves, several general principles of the operation of the system will be restated. First, the algorithm uses the oxygen value as its primary control input. Secondly, when the oxygen requirement is met, the algorithm then attempts to control $CO_2$. Second, it will be recalled that $CO_2$ concentration is increased by opening the $CO_2$ solenoid valve 140, which adds $CO_2$ from an external tank 146 or 150. $CO_2$ concentration is reduced by adding nitrogen from the membrane to displace the $CO_2$ in the container 10. It will be seen that the control algorithm will maintain the oxygen level within the control band until the $CO_2$ level is at or below the set level. It will be noted however that the $CO_2$ control does not become active until the oxygen setpoint is achieved. Flow control algorithm 168 will first be described, and then the specific programming of the controller for adding nitrogen, at the three different levels of purity, will be described in connection with different setpoint ranges as shown in FIGS. 13 and 14.

Figure 12:
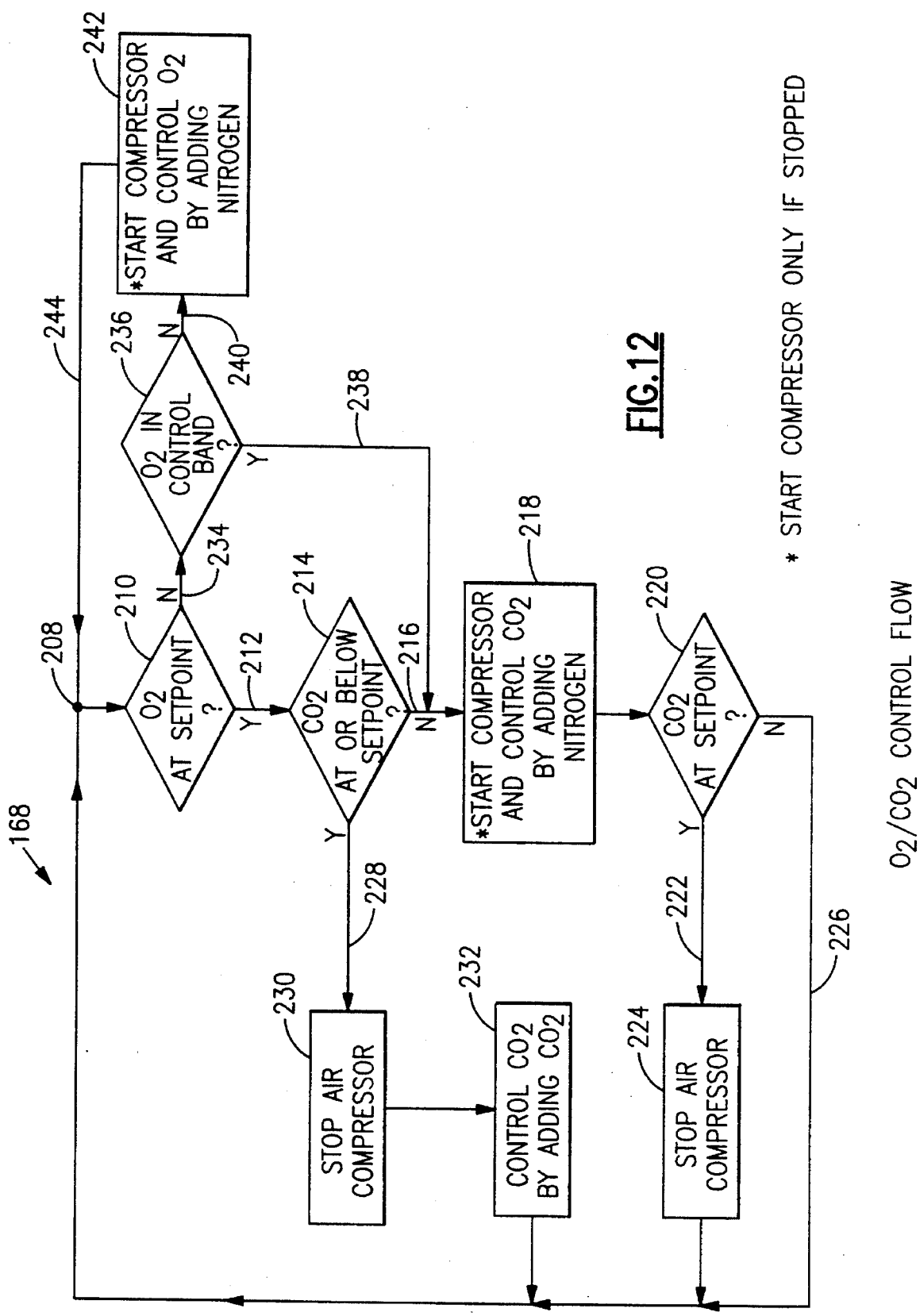
FIG. 12 is a flow chart of a software program residing in the microprocessor of the controlled atmosphere controller relating to the flow of oxygen and carbon dioxide.

Looking now at FIG. 12 the $O_2/CO_2$ flow control algorithm is entered at point 208 and the controller evaluates at step 210 whether the oxygen level in the container is at the programmed setpoint. If it is, the controller moves through the "Yes" branch 212 to ask, at step 214, whether the $CO_2$ level is at or below the programmed setpoint. If it is not the controller moves through the "No" branch 216 to step 218 where, if the compressor 30 is not already running it is started and the $CO_2$ level is reduced by adding nitrogen to the container thereby displacing $CO_2$. This condition is illustrated in the left hand portion of the graph shown in FIG. 15.

With the compressor operating to decrease the $CO_2$ level the controller moves to step 220 where, if the $CO_2$ level is at the programmed setpoint, it moves through the "Yes" branch 222 to stop the air compressor at 224 and returns to the beginning 208 of the flow control algorithm. If the $CO_2$ level, at step 220, is not at setpoint the controller moves through the "No" branch 226 returning to the starting point 208.

Figure 15:
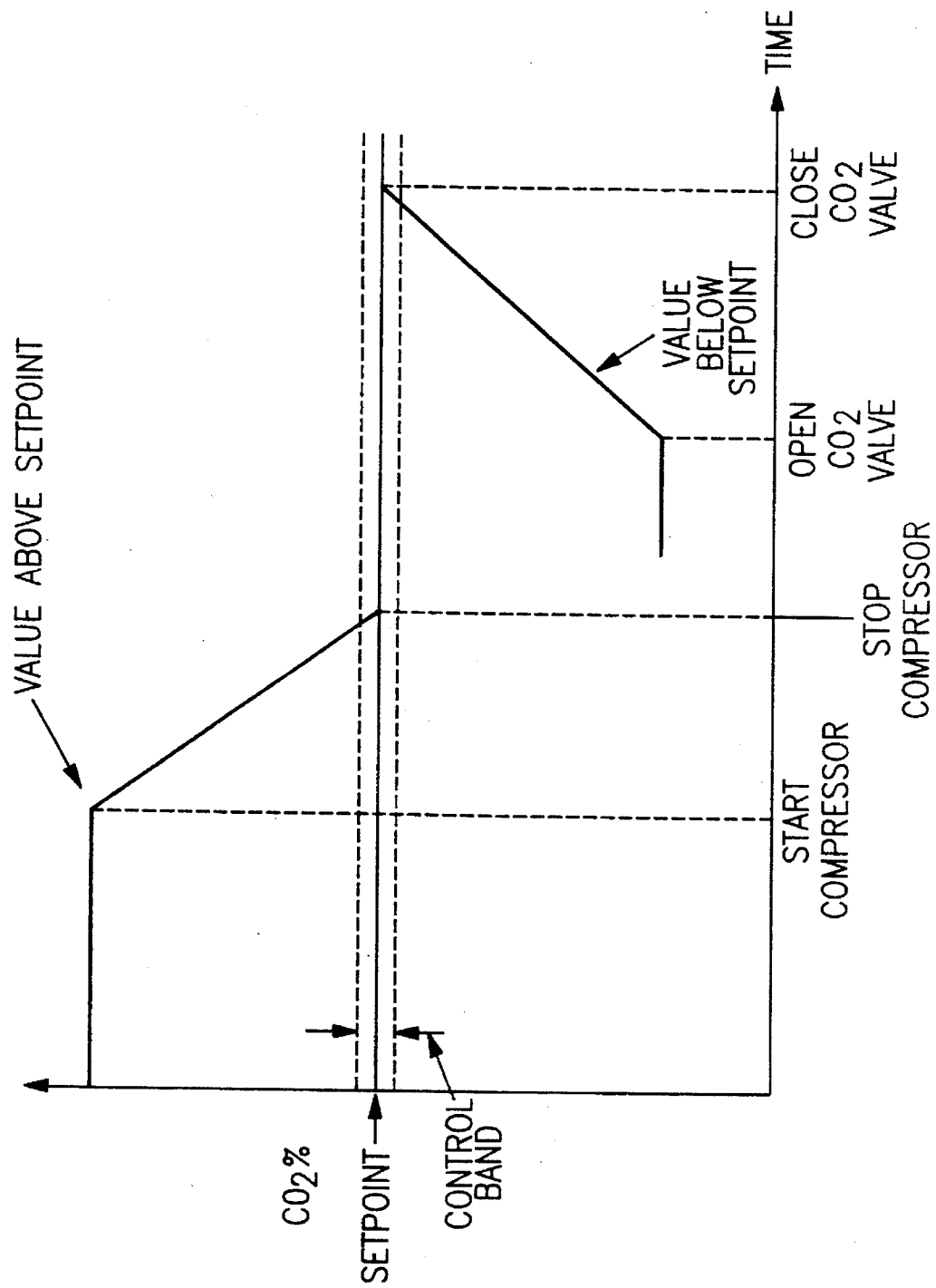
FIG. 15 is a graphical representation of the control of $CO_2$ to the container.

Returning back to step 214, if the $CO_2$ level is at or below setpoint the controller moves through the "Yes" branch 228 to stop the compressor at step 230, and, to increase the $CO_2$ level by adding $CO_2$ as at step 232. The addition of $CO_2$ as previously described and as illustrated in the right hand portion of FIG. 15 is achieved by the controller opening the $CO_2$ valve 140 until the $CO_2$ value reaches setpoint at which time the $CO_2$ valve 140 is closed.

Returning to step 210, if the $O_2$ level is not at setpoint the controller moves through the "No" branch 234 to step 236 where the controller asks whether the $O_2$ level is within the control band of the programmed $O_2$ level. If the $O_2$ is in the control band the controller then moves through the "Yes" branch 238 of step 236 to step 218. At step 218 the system will operate to control the $O_2$ level and as previously described the $CO_2$ control system will also be active.

If at step 236 it is determined that the $O_2$ level is not within the control band the controller will move through the "No" branch 240 to step 242 and commence oxygen control by adding nitrogen with the $CO_2$ control system not enabled. During such operation the controller continues to evaluate via branch 244, the oxygen and $CO_2$ levels relative to their setpoints and control bands to determine the best mode of operation of the system.

With reference now to FIGS. 13 and 14, the operation of the system illustrated in FIG. 4 to establish the desired oxygen level within the container and to maintain it within the control band by adding nitrogen to the container will be described.

It will be recalled that the system is operable at three different nitrogen purity levels. The first, with both valves A and B open produces 15% oxygen and 85% nitrogen. This has been defined as the low purity, high flow condition. The second with one valve (A or B) open, is the medium purity, medium flow condition with 5% oxygen and 95% nitrogen being produced. Third, with both valves A and B closed in the high purity, low flow condition the system produces 0.5% oxygen and 99.5% nitrogen.

Looking now at FIG. 13 the operation of the controller to operate the valves in response to the sensed oxygen level within the container is shown for setpoints between 0% and 5% oxygen. This drawing illustrates operation of the system to bring the oxygen level down from the approximately 20.8% oxygen contained in atmospheric air to the desired setpoint value. Looking at "time 0" the system begins operation with the compressor operating and both valves A and B open, and operates, as seen at segment 246, until the oxygen level has been brought down to approximately 15%. At that point valve B is closed and the system moves to the medium purity, medium flow condition as represented by segment 248 until the oxygen level reaches the 5% value. At that point valve A is closed, and the system operates as represented by segment 250, in the high purity, low flow condition until it reaches the lower end 252 of the control band. At that time control valve A is again opened and the system returns, as represented by segment 254, to a medium purity, medium flow condition until the upper range of the control band is reached, as at 256, whereupon valve A is again closed and the system returns to high purity, low flow.

Such alternating opening and closing of valve A continues in order to maintain the oxygen level within the container within the control band.

FIG. 14 illustrates the operation of the system where the oxygen setpoint is between 5% and 15%. As in the lower setpoint situation described in FIG. 13, the system begins operation in the low purity, high flow mode with valves A and B open as indicated by segment 258 in FIG. 14. Again, when the sensor determines that the oxygen level has reached 15% valve B is closed and it shifts to the medium purity, medium flow condition as indicated at segment 260. Valve B is then alternately opened and closed as the oxygen value hunts between the set value within the control band.

It should be appreciated that, regardless of the oxygen setpoint and the mode of operation, while step 242 of FIG. 12 is being carried out the controller, via branch 244 is continuously evaluating the $O_2$ value to determine the optimum system mode of operation.

Figure 9:
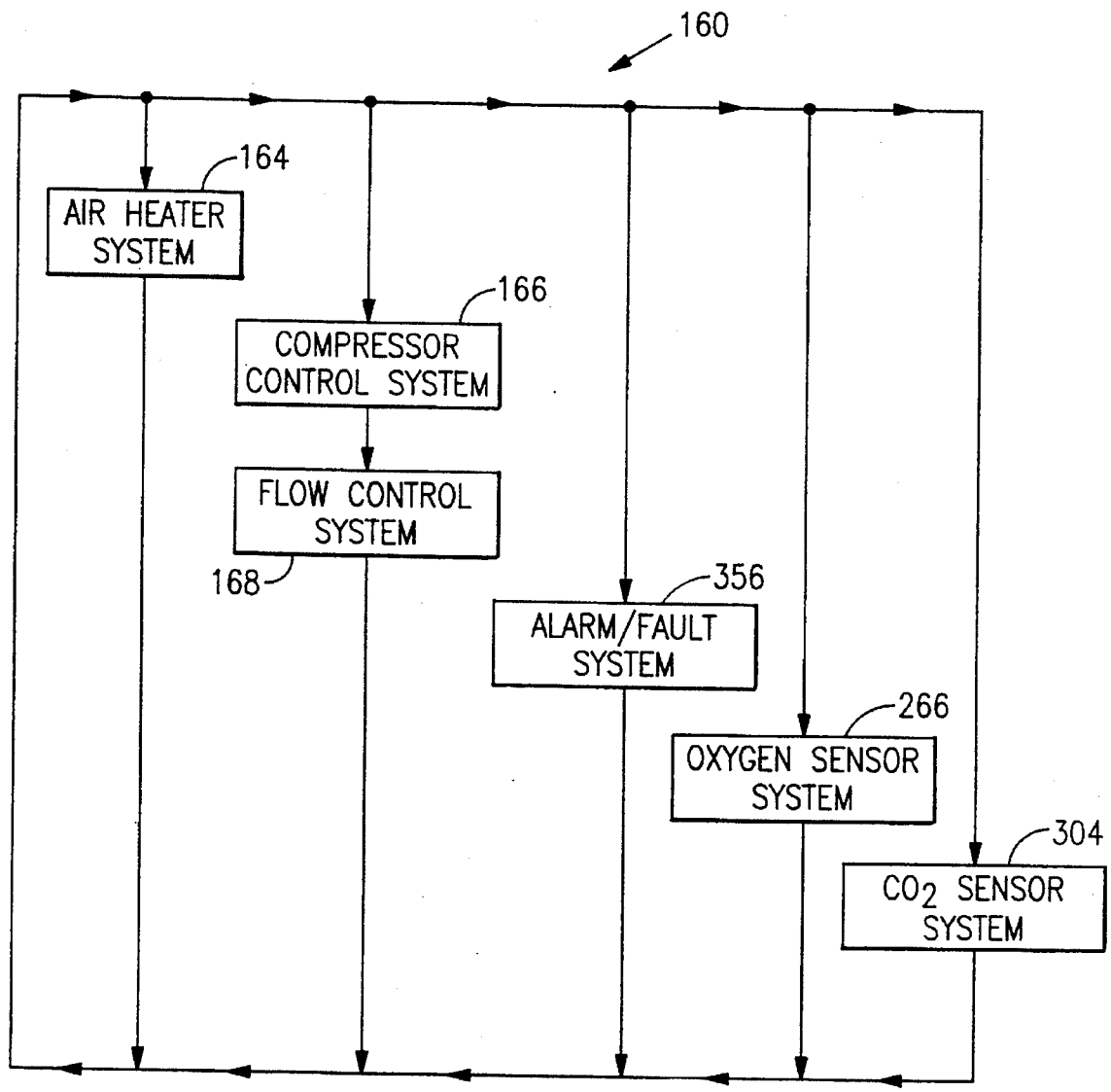
FIG. 9 comprises a flow chart of the main controlled atmosphere control algorithm showing the parallel operating relationship of various subsystem control algorithms.

Referring now to FIGS. 9 and 16, the automatic compensation and calibration of the oxygen sensor 110 is also programmed into the controlled atmosphere controller 50 and is referred to in the main algorithm as reference numeral 266. As previously mentioned, the oxygen sensor 110 is used to measure the concentration of oxygen within the container 10. Opening of the sample valve 134 will allow atmosphere from the container to pass over the sensor 110. As previously noted, the oxygen sensor 110 produces a small voltage output which is directly proportional to the oxygen concentration of the gas it is sensing. The microprocessor of the controlled atmosphere controller 50 converts the voltage output to a percent oxygen readout which is shown on the digital display 173. The microprocessor is programmed with the sensor specifications for a range of oxygen measurements from 0 to 20.9%, and the expected rating for this range of oxygen levels. The span of the oxygen sensor is defined as the difference between the voltage reading from the oxygen sensor at its maximum level less the reading at its minimum level. The span and linearity of the oxygen sensor are sensitive to temperature and aging. As an example, the span with time may decrease to the point where the sensor is not capable of producing a voltage output which matches the sensor specification for 20.9% oxygen. To compensate for this the controlled atmosphere controller 50 is programmed as illustrated in FIG. 16.

The oxygen sensor compensation and calibration program 266 is entered at point 268 where the controller 50 first ascertains the temperature of the air returning from the interior of the container as measured by temperature sensor 158, at step 270. If this temperature is below 5° C., the output of the sensor is compensated at step 272 using a compensation curve, which has been programmed into the controller 50. If the air temperature is not below 5° C. the controller moves through the "No" branch 274. From step 272, or from the "No" branch 274, the controller then considers whether one or the other of two events 276 or 278 have occurred. Accordingly, two hours after power has been turned on to the CA system, as at step 276, or after 24 hours have elapsed since the last calibration, as at step 278, the span of the oxygen sensor will be calibrated by passing outside air (20.8% oxygen) through the oxygen sensor 110. As indicated this occurs whenever the "Yes" branch of step 276 or 278, collectively 280, is followed.

Before initiating the test the controller ascertains, at step 282, whether the controlled atmosphere compressor 30 is on. Operation of the compressor is necessary in order to get a reliable air sample for the calibration and therefore if it is not on the controller will pass through the "No" branch 284 until the compressor is activated. When the compressor is on calibration is initiated via the "Yes" branch 286 at step 288 where the controller closes the nitrogen valve 122, the sample valve 134 and calibration gas valve 126, and opens the air valve 118 to thereby provide a flow of outside air across the sensor.

The output is then sensed and compared, at step 290, to determine if it is within the expected range of the sensor. If it is, via the "Yes" branch 292, the value is recorded at step 294 and is used to set the span of the oxygen sensor, and the system returns, via 296, to the starting point 268. If in step 290 the sensor is not within the expected range the controller passes, via the "No" branch 298, to display a "fault" result, at step 300, on the display 171. The system will then use the previous $O_2$ sensor span value, as at step 302, and return to start 268.

Figure 17:
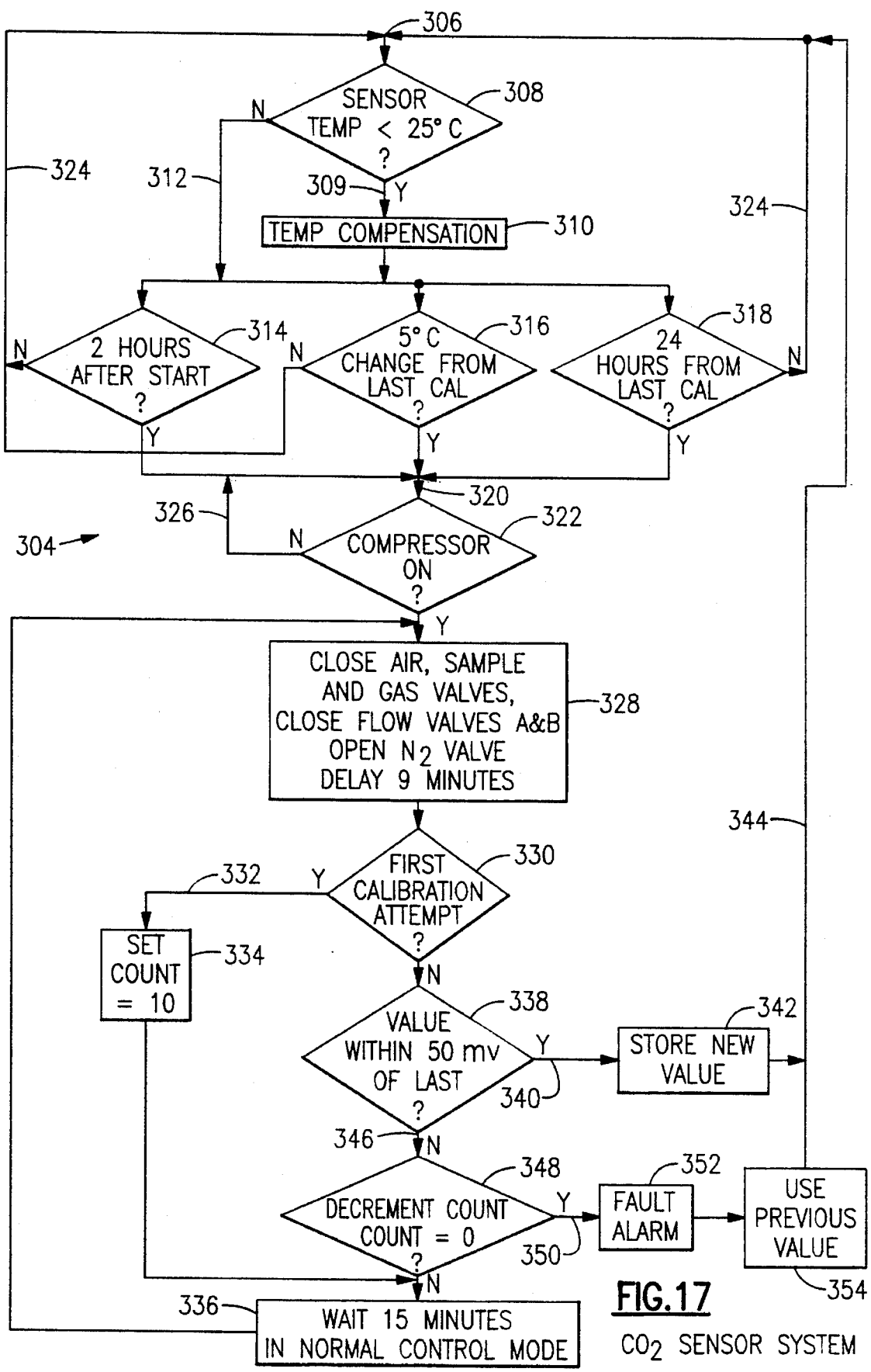
FIG. 17 is a flow chart of a software program residing in the microprocessor of the controlled atmosphere controller relating to temperature compensation and calibration of the carbon dioxide sensor system.

Referring now to FIG. 17, the span and zero point of the carbon dioxide sensor 112 are sensitive to temperature and thus the controller is programmed, as shown in this Figure, to compensate and/or calibrate the $CO_2$ sensor in a manner which will now be described.

The $CO_2$ sensor temperature compensation/calibration algorithm 304 is shown generally as it relates to the other control algorithms continuously operating in the controlled atmosphere system in FIG. 9 and in detail in FIG. 17.

The $CO_2$ sensor algorithm 304 is entered at 306 and at step 308 the controller determines using the input from the $CO_2$ sensors 112 internal temperature sensor whether the sensor temperature is less than 25° C. If it is, the controller will move through the "Yes" branch 309 to step 310 where the output of the $CO_2$ sensor is compensated using a temperature compensation curve which is programmed into the CA controller 50. From the temperature compensation step 310, or via the "No" branch 312 of step 308, the controller then determines whether one or more of three conditions exist which will result in $CO_2$ sensor calibration. These events, as indicated at steps 314, 316 and 318 are: "Is it two hours after system start"? "Has there been a 5° C. change since last calibration"?, or "Has it been 24 hours since the last calibration"?, respectively. A yes answer to any of these inquiries results in moving, via the "Yes" branch 320, to initiation of $CO_2$, sensor calibration at step 322. A "No" result to each of the inquiries 314, 316 and 318 results in a return to the start 306 via the "No" branches 324.

$CO_2$ sensor calibration is initiated by determining at 322 whether the CA compressor 30 is on to assure a reliable flow of gas through the $CO_2$ sensor 112. If the compressor is not on the test will not continue as evidenced by the "No" branch 326 result. Assuming the compressor is on the controller next opens the nitrogen solenoid valve 122, and closes the air, sample and calibration gas solenoids 118, 134 and 126. The controller also closes both nitrogen flow control valves A and B. The controller then goes into a nine minute delay period to allow system conditions to stabilize with the highest purity nitrogen passing over the $CO_2$ sensor, all as indicated at step 328. Following the nine minute delay the $CO_2$ sensor is read, and, if it is the first calibration attempt, as at step 330, the first zero point value is stored, and, via the "Yes" branch 332, the controller shifts the system into a normal control mode of operation as at 336 for fifteen minutes. A counter within the controller 50 is set at "10" at this time.

After the fifteen minutes of normal control operation the controller returns to step 328 and 330 where it generates a second zero point value which is compared to the first zero point value at step 338. If at step 338 the controller finds that both zero points are within 50 $m^v$ of each other, the second determined zero point is stored, via the "Yes" branch 340, at step 342. The control then returns to the start point 306 via branch 344 and the new zero value is used until the control decides that compensation or calibration is again necessary.

If, at step 338 the second zero value is not within 50 $m^v$ of the first value the controller moves through the "No" branch to step 348 wherein the counter 334 number is reduced by one and the new count is evaluated. If the new count is not "zero" the control passes, via the "No" branch 350, to step 336 and the process continues until a new zero value is determined, or, until the count at step 348 equals "zero". At this point the controller will move through the y branch 350 from step 348 and display a fault, as at 352, on the controller display 171. The controller 50 will then use the previous valid carbon dioxide zero point as at step 354 for system control.

In the preceding description, on several occasions the alarm/fault system generally identified by reference numeral 356 in FIG. 9 has been referred to. This system, programmed into the controlled atmosphere controller 50 is used to detect major faults in the system and to shut the system down or put it into a safe operating mode if one occurs. It also accumulates the amount of operating time for the system. After fixed operating intervals the control will display at 171, a service alarm, indicating it is time to service certain components of the unit. Specifically, a service alarm appears upon 5000 lapsed hours for the filters 90 and 92 and a compressor service alarm appears at 14,000 hours. After servicing the unit, the operator resets the timer for the particular component using the keyboard 162.

Other features of the alarm/fault system 356 include the following: (1) Monitoring the status of the compressor overtemperature switch 80. If this switch opens the compressor 30 will be shut down and the display will indicate a fault. (2) Monitoring of the status of the system fuse (not shown) and should it open the system will enter a stand-by mode as indicated by illumination of the light 162 on the display 170. (3) Monitoring the status of the heater overtemperature switch 99. If this switch opens, the heater 34 will be shut down and the display 171 will indicate a fault. (4) Monitors the output of the oxygen sensor 110 and the $CO_2$ sensor 112. If these sensors read outside their expected range as described above or fail to calibrate, the control will indicate a fault on the display 170.

What is claimed is:

1. A method of controlling operation of a controlled atmosphere system for controlling the atmosphere within a confined space, the system having an electrical control which has a display, and, electrically controlled components, including, in serial relationship, an air compressor, a filter having a drain valve, an air heater, a nonelectric separator for dividing air into separate streams comprising its principal constituents of oxygen and nitrogen, two or more flow control valves in parallel flow relationship for varying the purity of the nitrogen stream, and including temperature sensors for indicating the temperature leaving the heater and the temperature of the atmosphere within the confined space, a system pressure sensor for providing the pressure upstream of the control valves, the system further including, an oxygen sensor for generating an output indicating oxygen level in a gas, and a carbon dioxide sensor for indicating carbon dioxide level in a gas; comprising the steps of:

energizing the controlled atmosphere system;

simultaneously operating the electrical control to perform the following steps:

operating the compressor to an on or off condition responsive to inputs from the oxygen sensor and the carbon dioxide sensor;

operating the flow control to achieve setpoint oxygen and carbon dioxide levels in the atmosphere, in response to inputs from the oxygen sensor and the carbon dioxide sensor;

operating a control for the air heater to maintain the output temperature therefrom at a preset value;

monitoring the oxygen sensor, and, automatically compensating the output when a predetermined atmospheric temperature of the atmosphere is indicated;

monitoring the carbon dioxide sensor, and, automatically compensating the output when a predetermined change in the temperature of the carbon dioxide sensor occurs;

monitoring the status of certain system components relative to safety and other operating parameters, and, indicating on the display when said parameters are unsafe or out of an expected range.

2. The method of claim 1 wherein said step of operating the compressor includes the steps of:

setting a desired carbon dioxide level and a control band associated therewith;

setting a desired oxygen level and a control band associated therewith;

reading the carbon dioxide level from the carbon dioxide sensor;

comparing the carbon dioxide level to the set carbon dioxide level and the control band;

reading the oxygen level from the oxygen sensor;

comparing the oxygen level to the set oxygen level and control band;

starting the compressor if, either, the carbon dioxide level is above its control band or, if the oxygen level is outside its control band.

3. The method of claim 2 wherein the controlled atmosphere system is operated in conjunction with a refrigeration system controlling the temperature within the confined space, the refrigeration system having an electronic controller having programmed therein conditions under which the controlled atmosphere system will not be allowed to operate, and including means for enabling and disabling the controlled atmosphere system controller; including the step of stopping said air compressor whenever said disabling signal is received from the refrigeration system controller.

4. The method of claim 2 including the following steps when the compressor has been started:

reading the oxygen level from the oxygen sensor;

comparing the oxygen level to the set oxygen level and control band;

reading the carbon dioxide level from the carbon dioxide sensor;

comparing the carbon dioxide level to the set carbon dioxide level and control band;

stopping the compressor when, both the oxygen level is within the control band and the $CO_2$ level is at or below its set point.

5. The method of claim 1 wherein said step of operating the flow control includes the steps of:

setting a desired oxygen level and a control band associated therewith;

setting a desired carbon dioxide level and a control band associated therewith;

reading the oxygen level from the oxygen sensor;

comparing the oxygen level to the set oxygen level and control band; if the oxygen level is not at set point, and, the oxygen level is not in the control band, starting the compressor to thereby add nitrogen to the confined space;

if the oxygen level is at its setpoint level and the $CO_2$ level is not at or below setpoint, starting the compressor to control the $CO_2$ level by adding nitrogen to the combined space.

6. The method of claim 1 wherein said system includes two flow control valves and a fixed orifice in parallel fluid flow relationship for varying the purity of the nitrogen stream, further including the steps of:

operating the system in a low nitrogen purity, high nitrogen flow volume mode with both of said flow control valves open to bring the oxygen level within said confined space down to a first purity level;

closing one of said flow control valves to thereby operate said system in a medium nitrogen purity, medium flow mode of operation to bring the oxygen level within said container down to a second level lower than said first level; and closing the second flow control valve to thereby operate said system in a high nitrogen purity, low nitrogen flow condition to thereby bring said oxygen level in said confined space down to a third level lower than the previous levels.

7. The method of claim 6 including the steps of:

setting a desired oxygen level and a control band associated therewith; reading the oxygen level from the oxygen sensor; and alternately opening and closing one or more control valves to maintain the sensed oxygen level within the set oxygen level control band.

* * * * *